United States Patent
Kumar et al.

(10) Patent No.: US 10,628,740 B2
(45) Date of Patent: Apr. 21, 2020

(54) ASYNCHRONOUS STOCHASTIC GRADIENT DESCENT

(71) Applicant: INTERNATIONAL BUSINESS MACHINES CORPORATION, Armonk, NY (US)

(72) Inventors: Sameer Kumar, Bangalore (IN); Vijay A. Saraswat, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1022 days.

(21) Appl. No.: 15/146,917

(22) Filed: May 5, 2016

(65) Prior Publication Data

US 2017/0098171 A1   Apr. 6, 2017

Related U.S. Application Data

(60) Provisional application No. 62/236,165, filed on Oct. 2, 2015.

(51) Int. Cl.
   *G06N 3/08*   (2006.01)
(52) U.S. Cl.
   CPC ................... *G06N 3/084* (2013.01)
(58) Field of Classification Search
   CPC ........... G06N 3/084; G06N 3/08; G06N 20/00
   See application file for complete search history.

(56) References Cited

U.S. PATENT DOCUMENTS

| | | | | |
|---|---|---|---|---|
| 2013/0290223 | A1* | 10/2013 | Chapelle | G06N 20/00 706/12 |
| 2016/0103901 | A1* | 4/2016 | Kadav | G06F 16/178 707/614 |
| 2016/0269247 | A1* | 9/2016 | Chakradhar | H04L 67/12 |
| 2017/0308789 | A1* | 10/2017 | Langford | G06N 3/0454 |

OTHER PUBLICATIONS

Suyog Gupta, Wei Zhang, and Josh Milthorpe, "Model Accuracy and Runtime Tradeoff in Distributed Deep Learning", Sep. 14, 2015, arXiv, pp. 1-15. (Year: 2015).*

(Continued)

*Primary Examiner* — Kamran Afshar
*Assistant Examiner* — Ying Yu Chen
(74) *Attorney, Agent, or Firm* — Cantor Colburn LLP; Anthony Curro

(57) ABSTRACT

The example computer-implemented method may comprise computing, by a generator processor on each of a plurality of learners, a gradient for a mini-batch using a current weight at each of the plurality of learners. The method may also comprise generating, by the generator processor on each of the plurality of learners, a plurality of triples, wherein each of the triples comprises the gradient, the weight index of the current weights used to compute the gradient, and a mass of the gradient. The method may further comprise performing, by a reconciler processor on each of the plurality of learners, an allreduce operation on the plurality of triples to obtain an allreduced triple sequence. Additionally, the method may comprise updating, by the reconciler processor on each of the plurality of learners, the current weight at each of the plurality of learners to a new current weight using the allreduced triple sequence.

18 Claims, 6 Drawing Sheets

(56) References Cited

OTHER PUBLICATIONS

Alekh Agarwal, Olivier Chapelle, Miroslav Dudik, and John Langford, "A Reliable Effective Terascale Linear Learning System", Mar. 2014, Journal of Machine Learning Research 15 (2014), pp. 1111-1133. (Year: 2014).*

Hao Li, Asim Kadav, Erik Kruus, and Cristian Ungureanu, "MALT: Distributed Data-Parallelism for Existing ML Applications", Apr. 17, 2015, EuroSys '15 Proceedings of the Tenth European Conference on Computer Systems, pp. 1-16. (Year: 2015).*

* cited by examiner

ASYNCHRONOUS STOCHASTIC GRADIENT DESCENT

CROSS REFERENCE TO RELATED APPLICATIONS

This application claims the benefit of U.S. Provisional Patent Application No. 62/236,165, filed Oct. 2, 2015, which is hereby specifically incorporated by reference in its entirety.

BACKGROUND

The present disclosure relates to stochastic gradient descent algorithms and, more specifically, to methods, systems and computer program products for performing an asynchronous stochastic gradient descent.

Stochastic gradient descent is a gradient descent optimization method for minimizing an objective function that may be non-convex. Stochastic gradient descent is a popular algorithm for training a wide range of models in machine learning, including support vector machines, logistic regression and graphical models. One popular stochastic gradient descent algorithm is the least mean squares (LMS) adaptive filter.

Asynchronous stochastic gradient descent is commonly used to train deep neural networks (DNNs), which are behind many breakthroughs in machine learning in a variety of areas.

SUMMARY

In accordance with aspects of the present disclosure, a computer-implemented method for asynchronous stochastic gradient descent. The method may comprise computing, by a generator processor on each of a plurality of learners, a gradient for a mini-batch using a current weight at each of the plurality of learners, the current weight being uniquely identified by a weight index of each of the plurality of learners. The method may also comprise generating, by the generator processor on each of the plurality of learners, a plurality of triples, wherein each of the triples comprises the gradient, the weight index of the current weights used to compute the gradient, and a mass of the gradient, the mass equaling the number of mini-batches used to generate the gradient times a number of observations in the mini-batch. The method may further comprise performing, by a reconciler processor on each of the plurality of learners, an allreduce operation on the plurality of triples to obtain an allreduced triple sequence. Additionally, the method may comprise updating, by the reconciler processor on each of the plurality of learners, the current weight at each of the plurality of learners to a new current weight using the allreduced triple sequence, wherein the new current weight becomes the current weight for a next processing batch to be computed by the generator processor.

In accordance with additional aspects of the present disclosure, systems and computer program products for asynchronous stochastic gradient descent are also provided.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Embodiments include a method for combining L stochastic gradient descent (SGD) learners in parallel, and asynchronously, in such a way that staleness of each learner's communications is algorithmically bounded and the network is efficiently utilized. The method involves the definition of a new collective operation, referred to as continuous, bucketed allreduce, applicable in all settings where data has an associated timestamp and "mass", and it is desired to combine the data in a time-stamp preserving way while hitting a target mass.

In exemplary embodiments, the operation may be implemented purely in software, and may be accelerated by network and memory hardware. The operation can be sped up with approximations (e.g., trading off latency for mass). The present techniques minimize staleness, which may lead to better convergence than existing approaches, which may rely on separate parameter servers in addition to learner processing devices. The present techniques use collective operations to reduce network bandwidth. The present techniques also provide new weights to learner processing devices as quickly as possible, which decreases staleness. This may improve both the converged accuracy of test scores and the rate of convergence. These and other advantages will be apparent from the description that follows.

Figure 1:
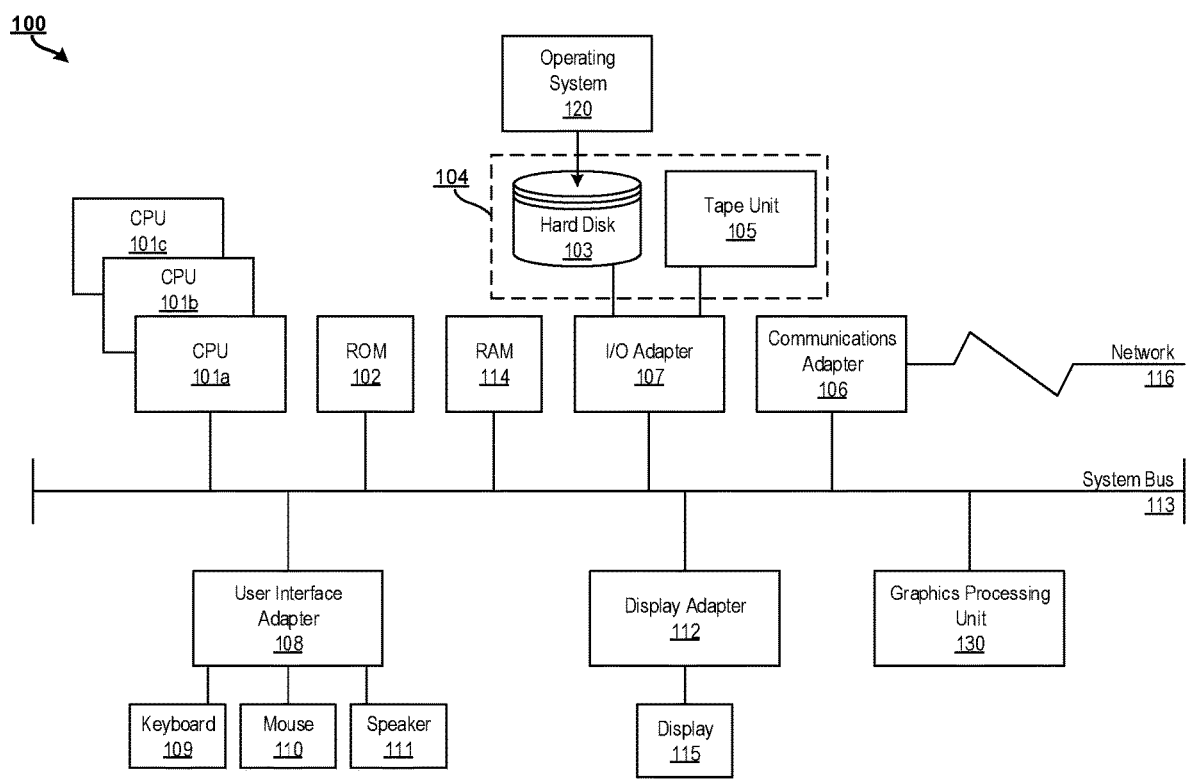
FIG. 1 illustrates a block diagram of a processing system for implementing the techniques described herein according to examples of the present disclosure.

FIG. 1 illustrates a block diagram of a processing system 100 for implementing the techniques described herein according to examples of the present disclosure. Processing system 100 is merely one example of a processing system for implementing the present techniques and other suitable processing systems may be utilized. For example, some of the components described may be omitted, while other components may be added. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel. In examples, graphics processing units 130 may be general purpose graphics processing units (GPGPUs) that may implement the techniques of the present disclosure.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
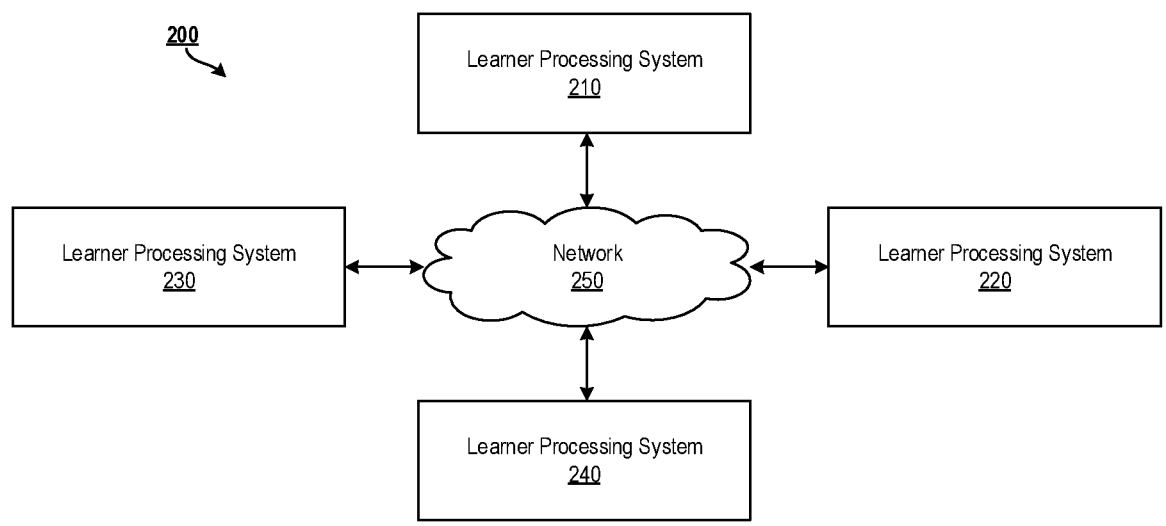
FIG. 2 illustrates a block diagram of an environment for performing an asynchronous stochastic gradient descent according to examples of the present disclosure.

FIG. 2 illustrates a block diagram of an environment 200 for performing an asynchronous stochastic gradient descent according to examples of the present disclosure. Environment 200 includes learner processing systems 210, 220, 230, 240 which are responsible for performing deep network learning, for example, as an instance of a non-convex optimization problem. This may be useful to train deep neural nets with a large number of parameters on large datasets. Environment 200 provides a distributed, asynchronous stochastic gradient descent technique referred to herein as a continuous all-reduce (CAR) technique. CAR is a peer-to-peer technique without a central parameter-server. It provides algorithmic bounds on staleness, permits computation and communication to be overlapped, and provides simple analysis of key computational properties. The present techniques may be faster than existing techniques while providing better accuracy. It should be appreciated that, although four learner processing systems 210, 220, 230, 240 are illustrated in FIG. 2, the present techniques may be utilized with any suitable number of learner processing systems.

In particular, learner processing systems 210, 220, 230, 240 utilize CAR techniques to keep learner processing systems 210, 220, 230, 240 continuously in synchrony using collective operations (e.g., broadcast, allreduce, etc.) without stalling compute threads (i.e., preventing the learners from computing gradients against the current weights). Using the CAR technique, a separate reconciler thread at each learner processing systems 210, 220, 230, 240 participates in a continuous, bucketed allreduce operation, with parameters S and C. In an example, in an allreduce operation, executed by a distributed team with L learners, each learner enters the operation with a value v and exits with a value obtained by reducing the set of L input values with a supplied associative, commutative binary reduction operator. In a bucketed allreduce operation, each learner exits with a sequence of values (each value is also called a bucket), rather than a single value. In a continuous, bucketed allreduce operation the participating thread does not leave the operation (until the very end of the execution of the algorithm); instead other threads asynchronously supply it with input, and the participating thread asynchronously produces an output stream of values. The continuous, bucketed allreduce operation can be approximated by a bucketed allreduce operation executed by L threads, operating in a tight loop, re-entering the bucketed allreduce operation after accepting input from the environment, if it is available.

At a high-level, these threads continuously receive input from their corresponding learner processing systems 210, 220, 230, 240 (in the forms of gradients with mass B). By using an appropriate distributed algorithm on network 250, the threads together (collectively) perform a bucketed allreduce operation on the input (such as sumreduce with ordered mixing) and deliver the result (one or more buckets with target mass S) at each one of learner processing systems 210, 220, 230, 240. Each learner processing systems 210, 220, 230, 240 uses these received gradients to update weights. Once the gradients corresponding to C observations have been processed, the resulting weights are made available to learner processing systems 210, 220, 230, 240. In examples, learner processing systems 210, 220, 230, 240 operate continuously, generating gradients with the current weight of the respective learner processing system. CAR introduces an algorithmic bound on staleness in the form of $T_m/T_a$, where $T_m$ is the time to generate gradients from a mini-batch, and $T_a$ is the time to perform an allreduce. Staleness represents the difference between the index of the weight used to compute the gradient and the index of the weight that was updated with contribution from this gradient.

In one example of CAR, assume L learner processing systems 210, 220, 230, 240, which one generate thread and one reconciler thread. Each generate thread maintains a copy of the neural network (model) and the current set of weights. The generate thread continuously receives mini-batches, computes gradients, and emits a triple (G, I, M) where I is the index of the weights used to compute the gradient G, and M is the number of observations used to compute G.

Learner processing systems 210, 220, 230, 240 communicate through two non-blocking swap buffers—toLearner and fromLearner. Each learner processing system 210, 220, 230, 240 has a current set of weights, a gradient buffer (which maintains G, and M), and a weight buffer. The generate thread obtains a mini-batch from the data-store (e.g., a global file system, such as the general parallel file system (GPFS)), accumulates the gradients in G, adding 1 to M. If the fromLearner buffer is empty (initially it is), the generate thread swaps (G, I, M) with the contents of this buffer using a constant-time, atomic, non-blocking operation. Accordingly, the gradient in the received buffer is empty and its mass is 0. I is set to the index of the current weight.

The generate thread then checks to see if the toLearner buffer was filled since it was last checked, and, if so, swaps its content with weight buffer using a constant-time, atomic, non-blocking operation. It updates its weights and changes I to the index of the received weight. The received weight also has an associated mass M'. If M' crosses an epoch multiple then a test run is triggered (with the current weights) by one of learner processing systems 210, 220, 230, 240. If M' exceeds the total number of mini-batches (for the job) then the generate thread terminates. Else, it loops back. Thus, the generate thread serves to continuously generate gradients from incoming mini-batches given the current weight.

The reconciler thread at each learner processing system 210, 220, 230, 240 receives gradients from the respective generate thread of that learner processing system, communicates with the reconciler threads at the other learner processing systems 210, 220, 230, 240, and generates new weights. In more detail, the reconciler thread retrieves gradients from the fromLearner buffer, if the buffer is not empty. Regardless of whether the buffer is empty, the reconciler thread enters a collective allreduce operation.

The reduction operation on gradients sums the gradients and the associated mass and takes the minimum of the associated timestamps. Once the reconciler thread emerges from the collective, the reconciler thread has the reduced gradient (collected across the learner processing systems 210, 220, 230, 240) and the associated mass. The reconciler thread has its own copy of the model and uses it to update the weights, using the incoming gradient. This updated weight is available for pickup by the generate thread in the toLearner buffer. In examples, if the weight is not picked up before a new weight is available, the new weight overwrites the existing weight in the buffer. The reconciler thread terminates if the total of the received masses exceeds the total number of mini-batches for the job. Otherwise it loops back to the beginning. Thus, the reconciler thread effectively continuously loops entering an allreduce even if the reconciler thread has no gradient to contribute, and on exit updates the weights for its copy of the model.

Using these techniques, the reconciler thread at each learner processing system 210, 220, 230, 240 produces the same sequence of weights. Each of the reconcilers can perform any deterministic function on the received gradients (e.g., combine the received gradient with past gradients, use it to compute new weights, etc.). As long as each reconciler uses the same function on the same input sequence, the reconcilers will remain in sync, generating the same output sequence, which serves as a "global clock" across learner processing systems 210, 220, 230, 240.

In examples, learner processing systems 210, 220, 230, 240 may be topologically optimized. For example, a learner and the reducer could share the same node and communicate via a shared memory. In another example, learners and reducers can be on separate nodes and communicate via RDMA. This example results in minimal CPU bandwidth and reduced memory usage from the reducer on the learner, which enables them to compute at higher throughput.

Figure 3:
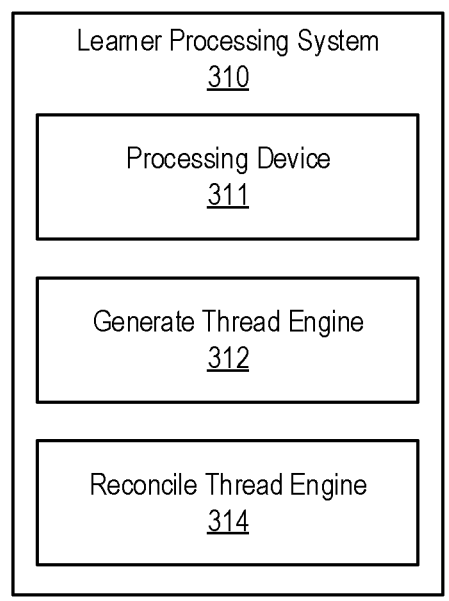
FIG. 3 illustrates a block diagram of a processing system for performing an asynchronous stochastic gradient descent according to examples of the present disclosure.

FIG. 3 illustrates a block diagram of a processing system 310 for performing an asynchronous stochastic gradient descent according to examples of the present disclosure. It should be appreciated that processing system 310 may represent any of learner processing systems 210, 220, 230, 240 of FIG. 2. The various components, modules, engines, etc. described regarding FIG. 3 may be implemented as instructions stored on a computer-readable storage medium, as hardware modules, as special-purpose hardware (e.g., application+specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 311 for executing those instructions on learner processing system 310. Thus system memory 114 of FIG. 1 can be said to store program instructions that when executed by processing device 311 implement the engines described herein. Other engines may also be utilized to include other features and functionality described in other examples herein.

Processing system 310 may include processing device 311, a generate thread engine 312, and a reconcile thread engine 314. Alternatively or additionally, the processing system 310 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In examples, processing device 311 may be a multi-threaded processor and may execute generate thread engine 312 and/or reconcile thread engine 314 as multiple threads. Additionally, in examples, processing device 311 may be graphics processing unit (GPU) such as a general purpose graphics processing units (GPGPU).

Generate thread engine 312 performs the techniques described in FIG. 2 regarding the generate thread. Similarly, reconcile thread engine 314 performs the techniques described in FIG. 2 regarding the reconcile thread. Using these techniques, bounds on staleness, super-batch size, and epoch time can be determined as follows.

For the bound on staleness, let $T_a$ be the amount of time it takes to complete an allreduce operation (for the given model and physical network connecting the learner processing systems), and $T_m$ be the amount of time to compute the gradients for a mini-batch. Note that $T_a$ depends on the number of parameters in the model, on the network, and the choice of allreduce algorithm. $T_m$ depends on B (the size of the mini-batch), the model, and the compute engine used. A bound on the staleness of CAR can be determined as follows assuming that learner processing system 310 is computing gradients for weight index i. By the time it completes ($T_m$ seconds later), the weights are updated at learner processing system 310 at most $s=T_m/T_a$ times. Therefore the maximum staleness for learner processing system 310 is s.

For the bound on the super-batch size, the expected number of mini-batches that will reduce in a given cycle is $L \times T_a/T_m$ (L learning processing systems produce $L/T_m$ mini-batches in the unit interval). This provides an immediate bound on the usable parallelism. If it is desired to keep this number close to a hyper-parameter S (the super-batch size) in order to reach a target accuracy, then L can be no bigger than $S \times T_m/T_a$. Moving to an improved network resulting in reduce $T_a$ increases the amount of parallelism that can be exploited while still hitting the target accuracy. In other words, for given values of L, $T_m$ and $T_a$, gradients are delivered to each reconciler thread with an expected size of $L \times T_a/T_m$.

For the bound on epoch time, let the generate thread take $T_m$ to compute gradients for a mini-batch and $T_u$ to updates the weights it receives from the reconciler. If $T_a < T_m$ then a new weight is available to the generate thread in each loop, and the thread takes time Tm+Tu to complete one cycle. Therefore the time to complete an epoch of E mini-batches is at least $(E/L) \times (T_m+T_a)$. On the other side of the "material balance" equation, the reconciler thread takes $T_a+T_w$ time to complete one all reduce and update weights once. During this time it processes $L \times (T_a/T_m)$ mini-batches. Therefore, it takes $(E/L) \times (T_m/T_a) \times (T_a+T_w)$ time to process all mini-batches. The time taken is the maximum of these two times.

In examples, the work done by the reconciler thread can be parallelized with one thread performing allreduces and a second thread receiving gradients from the first and updating the weights. This enables the thread performing the allreduce to process faster. Additionally, the symmetric nature of CAR means that in may be easier to implement and scale the present techniques than a centralized parameter server.

In examples, learner processing system 310 may be communicatively connected to other learner processing systems (e.g., learner processing systems 210, 220, 230, 240 of FIG. 2) via a network (e.g., network 250 of FIG. 2).

Figure 4:
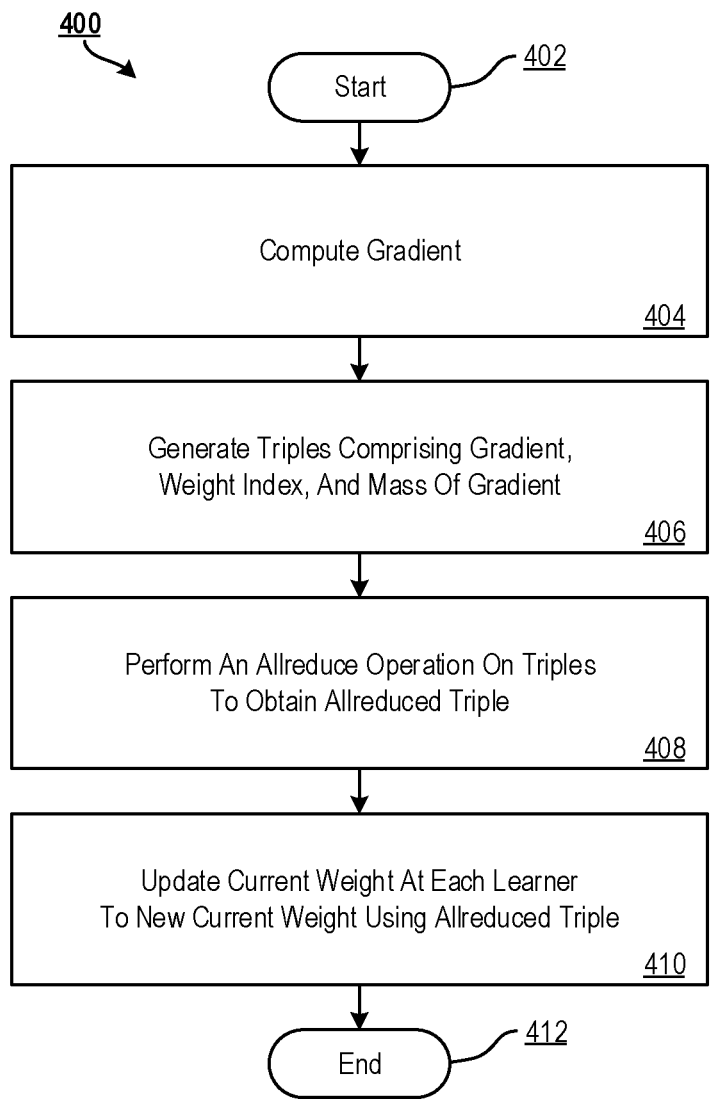
FIG. 4 illustrates a flow diagram of a method for performing an asynchronous stochastic gradient descent according to examples of the present disclosure.

FIG. 4 illustrates a flow diagram of a method 400 for performing an asynchronous stochastic gradient descent according to examples of the present disclosure. The method 400 starts at block 402 and continues to block 404.

At block 404, the method 400 includes computing, such as by a generator processor (e.g., generate thread engine 312 of FIG. 3) on each of a plurality of learners (e.g., learner processing systems 210, 220, 230, 240 of FIG. 2, and/or learner processing systems 310 of FIG. 3), a for a mini-batch using a current weight at each of the plurality of learners, the current weight being uniquely identified by a weight index of each of the plurality of learners. In examples, the plurality of learners may be topologically optimized as discussed above.

At block 406, the method 400 includes generating, by the generator processor on each of the plurality of learners, a plurality of triples. Each of the triples may include the computed gradient, the weight index of the weights used to compute the gradient, and a mass gradient, the mass equaling the number of mini-batches used to generate the gradient times a number of observations in the mini-batch. That is, the triple may be in the form (G, I, M) where G is the computed gradient, I is index of weights, and M is the number of observations used to compute the gradient.

At block 408, the method 400 includes performing, by a reconciler processor (e.g., reconciler thread engine 313 of FIG. 3) on each of the plurality of learners, an allreduce operation on the plurality of triples to obtain an allreduced triple sequence. In examples, the allreduce operation may include summing the gradients (i.e., performing a summation function) and the associated masses. In other examples, the allreduce operation may include performing a minimum function on the plurality of triples to determine a minimum of the weight indices of the plurality of triples. The allreduce operation may be performed in stages across subsets of the plurality of learners.

At block 410, the method 400 includes updating, by the reconciler processor or each of the plurality of learners, the current weight at each of the plurality of learners to a new current weight using the allreduced triple sequence. In examples, the new current weight becomes the current weight for a next processing batch to be computed by the generator processor. In examples, the allreduced triple sequence includes at least one triple, and a mass associated with each of the at least one triples is approximately equal to a given target mass. The method 400 continues to block 412 and ends.

Additional processes also may be included. For example, the method 400 may include communicating the plurality of triples from the generator processor to the reconciler processor using a non-blocking to-Learner buffer; and communicating the current weight with index from the reconciler processor to the generator processor through the use of a non-blocking from-Learner buffer. In examples, the method 400 may include performing a summing-in of a new gradient into an existing gradient when it is determined that the to-buffer is full, thereby causing an increase in the mass associated with the existing gradient.

It should be understood that the processes depicted in FIG. 4 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. In examples, the present disclosure may be implemented on cloud computing.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
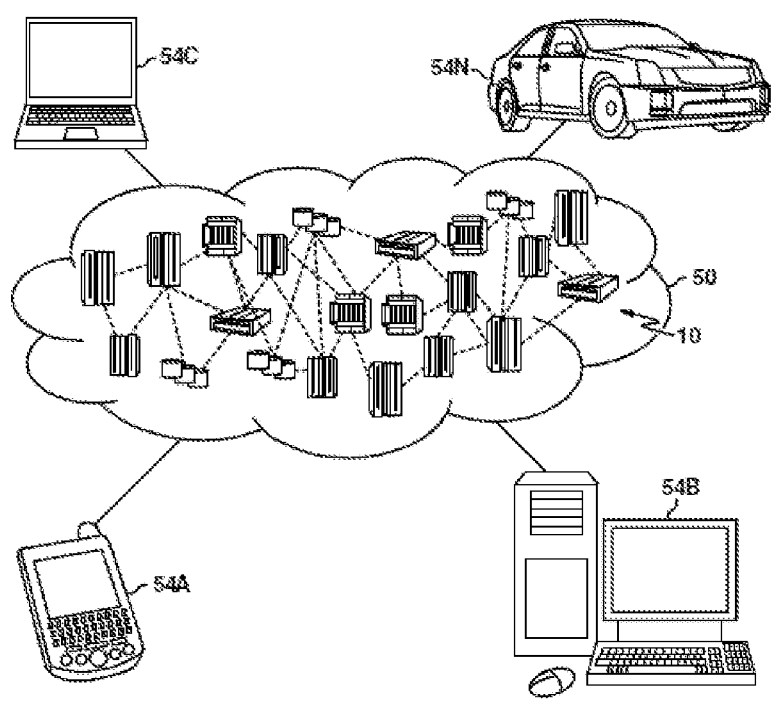
FIG. 5 illustrates a cloud computing environment according to examples of the present disclosure.

Referring now to FIG. 5, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
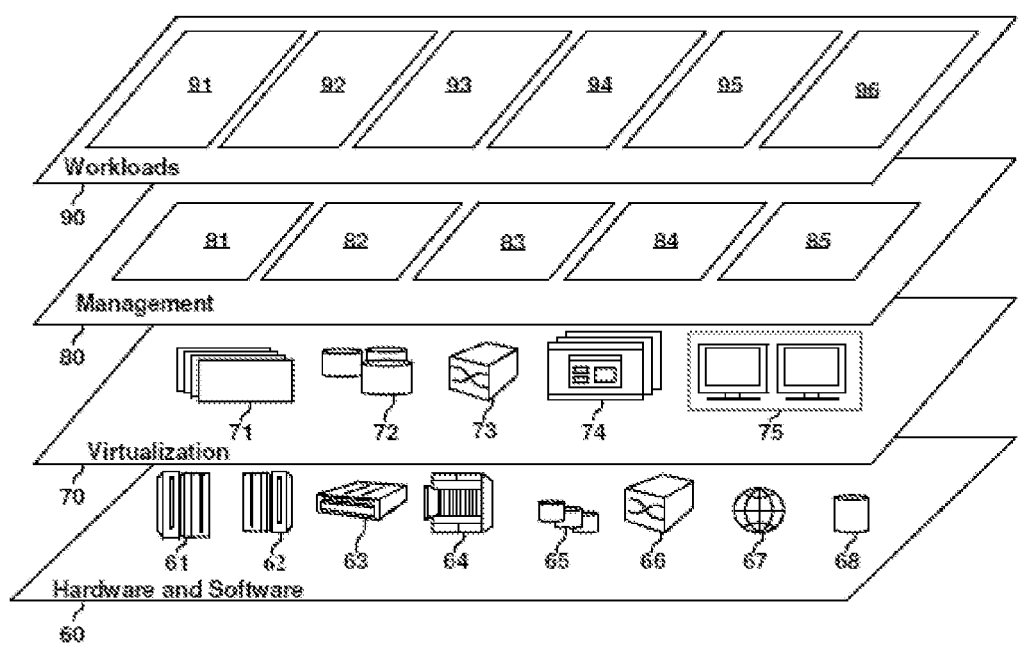
FIG. 6 illustrates abstraction model layers according to examples of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asynchronous stochastic gradient descent 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for asynchronous stochastic gradient descent, the method comprising:
  computing, by a generator processor on each of a plurality of learners, a gradient for a mini-batch using a current weight at each of the plurality of learners, the current weight being uniquely identified by a weight index of each of the plurality of learners, wherein the plurality of learners are arranged in a peer-to-peer arrangement without a parameter server;
  generating, by the generator processor on each of the plurality of learners, a plurality of triples, wherein each of the triples comprises the gradient, the weight index of the current weights used to compute the gradient, and a mass of the gradient, the mass equaling a number of mini-batches used to generate the gradient times a number of observations in the mini-batch;

performing, by a reconciler processor on each of the plurality of learners, an allreduce operation on the plurality of triples to obtain an allreduced triple sequence; and updating, by the reconciler processor on each of the plurality of learners, the current weight at each of the plurality of learners to a new current weight using the allreduced triple sequence, wherein the new current weight becomes the current weight for a next processing batch to be computed by the generator processor.

2. The computer-implemented method of claim 1, wherein the generator processor and the reconciler processor execute simultaneously.

3. The computer-implemented method of claim 2, further comprising:

communicating the plurality of triples from the generator processor to the reconciler processor using a non-blocking to-Learner buffer; and communicating the current weight with index from the reconciler processor to the generator processor through the use of a non-blocking from-Learner buffer.

4. The computer-implemented method of claim 3, further comprising:

performing a summing-in of a new gradient into an existing gradient when it is determined that the non-blocking to-Learner buffer is full.

5. The computer-implemented method of claim 1, wherein performing the allreduce operation comprises performing a summation function on the plurality of triples to sum the masses of the plurality of triples.

6. The computer-implemented method of claim 1, wherein performing the allreduce operation comprises performing a minimum function on the plurality of triples to determine a minimum of the weight indices of the plurality of triples.

7. The computer-implemented method of claim 1, wherein the allreduce operation is performed in stages across subsets of the plurality of learners.

8. The computer-implemented method of claim 1, wherein the allreduced triple sequence comprises at least one triple, and wherein a mass associated with each of the at least one triples is equal to a given target mass.

9. The computer-implemented method of claim 1, wherein at least one of the generator processor and the reconciler processor are multi-threaded processors.

10. A system for Asynchronous stochastic gradient descent, the system comprising:

a processor in communication with one or more types of memory, the processor configured to:

compute, by a generator processor on each of a plurality of learners, a gradient for a mini-batch using a current weight at each of the plurality of learners, the current weight being uniquely identified by a weight index of each of the plurality of learners, wherein the plurality of learners are arranged in a peer-to-peer arrangement without a parameter server;

generate, by the generator processor on each of the plurality of learners, a plurality of triples, wherein each of the triples comprises the gradient, the weight index of the current weights used to compute the gradient, and a mass of the gradient, the mass equaling a number of mini-batches used to generate the gradient times a number of observations in the mini-batch;

perform, by a reconciler processor on each of the plurality of learners, an allreduce operation on the plurality of triples to obtain an allreduced triple sequence; and update by the reconciler processor on each of the plurality of learners, the current weight at each of the plurality of learners to a new current weight using the allreduced triple sequence, wherein the new current weight becomes the current weight for a next processing batch to be computed by the generator processor.

11. The system of claim 10, wherein the generator processor and the reconciler processor execute simultaneously.

12. The system of claim 11, wherein the processor is further configured to:

communicate the plurality of triples from the generator processor to the reconciler processor using a non-blocking to-Learner buffer; and communicate the current weight with index from the reconciler processor to the generator processor through the use of a non-blocking from-Learner buffer.

13. The system of claim 12, wherein the processor is further configured to:

perform a summing-in of a new gradient into an existing gradient when it is determined that the non-blocking to-Learner buffer is full.

14. The system of claim 10, wherein performing the allreduce operation comprises performing a summation function on the plurality of triples to sum the masses of the plurality of triples.

15. The system of claim 10, wherein performing the allreduce operation comprises performing a minimum function on the plurality of triples to determine a minimum of the weight indices of the plurality of triples.

16. The system of claim 10, wherein the allreduce operation is performed in stages across subsets of the plurality of learners.

17. The system of claim 10, wherein the allreduced triple sequence comprises at least one triple, and wherein a mass associated with each of the at least one triples is equal to a given target mass.

18. A computer program product for asynchronous stochastic gradient descent, the computer program product comprising:

a non-transitory storage medium readable by a processing circuit and storing instructions for execution by the processing circuit for performing a method comprising:

computing, by a generator processor on each of a plurality of learners, a gradient for a mini-batch using a current weight at each of the plurality of learners, the current weight being uniquely identified by a weight index of each of the plurality of learners, wherein the plurality of learners are arranged in a peer-to-peer arrangement without a parameter server;

generating, by the generator processor on each of the plurality of learners, a plurality of triples, wherein each of the triples comprises the gradient, the weight index of the current weights used to compute the gradient, and a mass of the gradient, the mass equaling a number of mini-batches used to generate the gradient times a number of observations in the mini-batch;

performing, by a reconciler processor on each of the plurality of learners, an allreduce operation on the plurality of triples to obtain an allreduced triple sequence; and updating, by the reconciler processor on each of the plurality of learners, the current weight at each of the plurality of learners to a new current weight using the allreduced triple sequence, wherein the new current weight becomes the current weight for a next processing batch to be computed by the generator processor.

\* \* \* \* \*